UNITED STATES PATENT OFFICE.

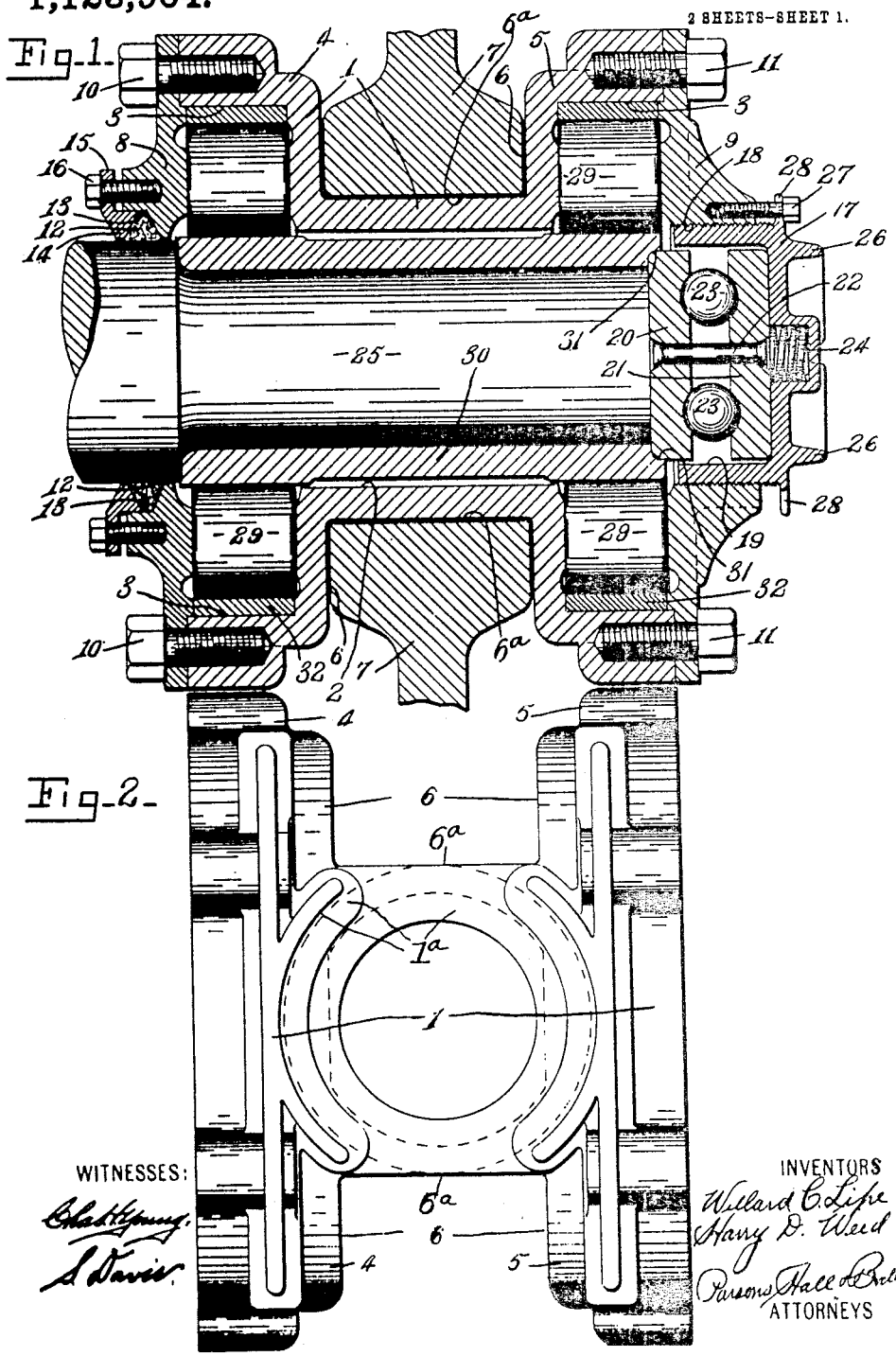

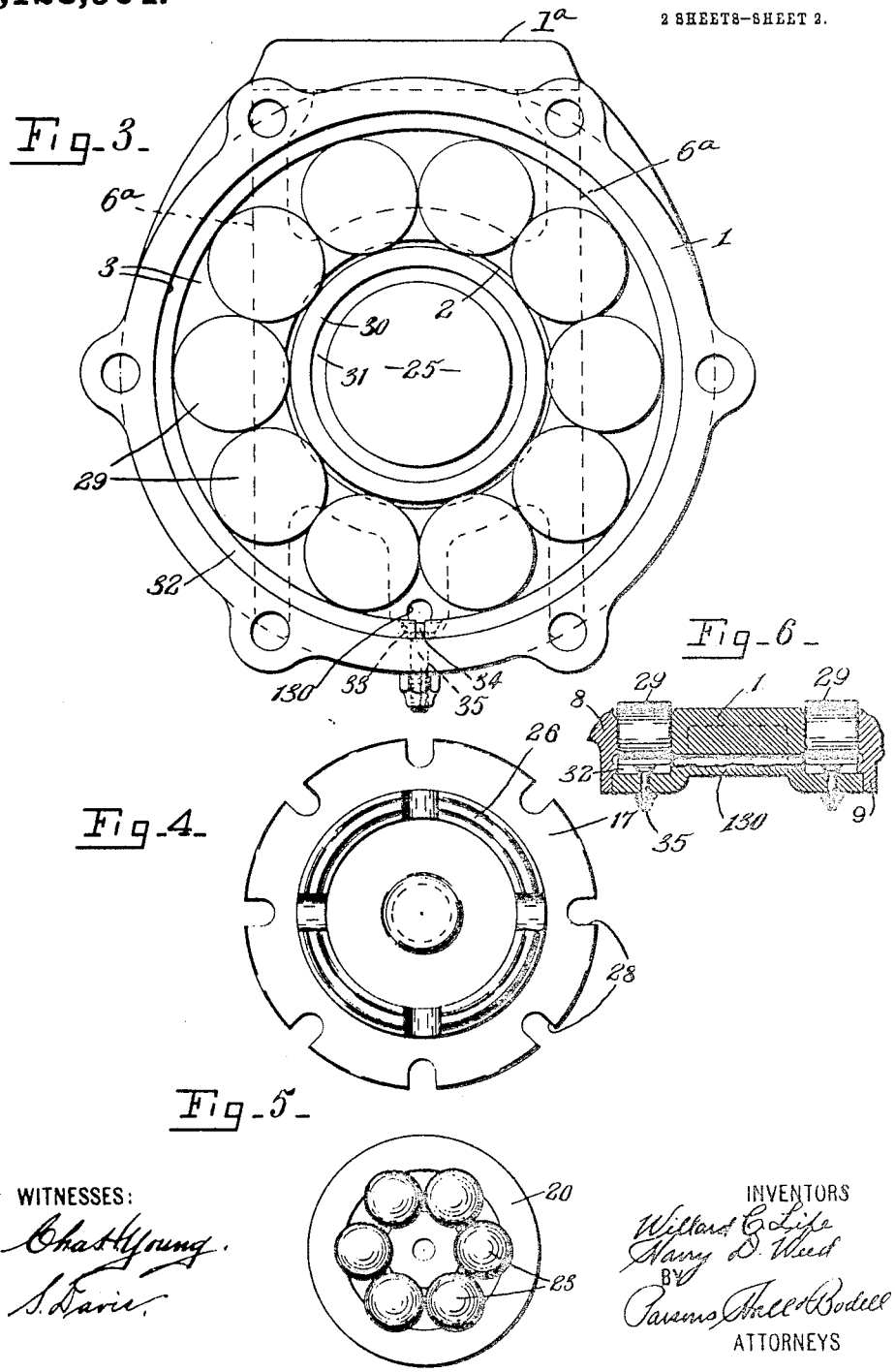

WILLARD C. LIPE AND HARRY D. WEED, OF SYRACUSE, NEW YORK, ASSIGNORS TO RAILWAY ROLLER BEARING COMPANY, OF SYRACUSE, NEW YORK, A CORPORATION OF NEW YORK.

ANTIFRICTION-BEARING FOR AXLES.

1,123,904. Specification of Letters Patent. Patented Jan. 5, 1915.

Application filed October 28, 1909. Serial No. 525,200.

*To all whom it may concern:*

Be it known that we, WILLARD C. LIPE and HARRY D. WEED, of Syracuse, in the county of Onondaga and State of New York, have invented a certain new and useful Antifriction - Bearing for Axles, of which the following is a specification.

This invention has for its object the production of an antifriction bearing for axles, which is particularly simple in construction and highly efficient and durable in use, and it consists in the combinations and constructions hereinafter set forth and claimed.

In describing this invention, reference is had to the accompanying drawings, in which like characters designate corresponding parts in all the views.

Figure 1 is a sectional view, partly in elevation, of this bearing, contiguous portions of an axle and truck-frame being also shown. Fig. 2 is a plan of the detached bearing. Fig. 3 is an end view thereof, the outer end wall being removed. Figs. 4 and 5 are detail views of parts of said bearing which resist the end thrust of the axle. Fig. 6 is a detail view of a portion of the journal box, two of the rollers being also shown.

1 is a journal box provided with an axle receiving opening 2 opening through one end wall thereof and having its opposite end closed, said opening 2 having adjacent its opposite ends concentric annular raceways 3 spaced apart from each other, and each formed with opposing flat sides or surfaces disposed at right angles to the axis of the bearing. Preferably, the raceways 3 are substantially cylindrical, are of greater diameter than the intervening portion of the axle opening, and are connected by an oil passage, 130, Fig. 6, extending parallel to the axis of the opening 2 through the portion of the wall of the journal box between the bottoms of the raceways.

In the illustrated construction of our bearing, the journal box is provided with external projecting portions 4, 5 into which the raceways 3 extend, and is also provided between the planes of the raceways 3 with external oppositely arranged and vertical channels 6 confined between opposing sides of said projecting portions 4, 5 and adapted to receive parts of a truck-frame 7 of any desirable construction, the distance between said channels being usually less than the diameters of the raceways 3, the channels having vertical bottoms 6ª as illustrated in Figs. 1 and 2 and in dotted lines Fig. 3. It is apparent, however, that the journal box may be provided with any other suitable means arranged between the planes of the raceways 3, or otherwise, for engaging a truck-frame. The box is also formed with a seat 1ª, Figs. 2 and 3, for the spiral spring of the truck frame, this seat being located on the upper side of the box between the bottoms of the channels as clearly seen in Fig. 3.

Preferably, the journal box of our bearing is provided with detachable end walls or disks 8, 9, respectively, secured to the main body or intermediate part of the journal box by any desirable fastening means, as screws 10, 11, these end walls having their opposing faces provided with flat surfaces forming sides of the raceways, and said end walls when removed permitting access to the interior of the journal box. The removable end wall 8 is provided with an axial opening forming a continuation of the opening 2 and may be provided with suitable means for preventing the entrance of dust to the interior of the journal box, said means being here shown as a packing ring 12 arranged in an annular channel 13 in the outer face of the end wall 8, and a clamping sleeve 14 having an annular part thereof movable axially into said channel against the ring 12, and provided with a flange 15 which is engaged by clamping screws 16 screwing into the end wall 8. The other removable end wall 9 supports means for adjusting the bearing endwise relatively to the axle and for resisting the end thrust of the axle, said means comprising a cylindrical plug 17 screwing within a central opening 18 in the end wall 9, the plug being formed with an internal chamber 19 opening through its inner end in alinement with the opening 2 and containing a pair of hard disks 20, 21 of less diameter than said chamber and independently revoluble upon a pin 22 connecting said disks and passed axially therethrough, the disk 20 projecting beyond the inner end of the plug 17, said chamber 19 also containing an annular series of antifriction balls 23 encircling the pin 22 and rolling in grooves in the opposing sides of the disks 20, 21.

A coiled spring 24 is arranged in a pocket in the outer end of the plug 17 and bears against the disk 21 for causing the disk 20 to engage the end of the axle 25 equipped with our bearing, even though the journal box and the contiguous part of the truck-frame may spring slightly laterally during the strains to which the bearing is subjected. The plug 17 is provided with a transversely slotted ring-shaped rib 26 on its outer face for facilitating turning thereof, and may be held in its adjusted position by a lock screw 27 having one end adapted to enter one of a plurality of peripheral notches 28 in an annular flange on the plug, and its other end screwing within the wall 9.

Each raceway 3 contains an annular series of rollers 29 arranged parallel to the axis of the bearing and having flat end faces disposed at right angles to the axes of the rollers and engaging the opposing flat sides or surfaces of the raceways, said rollers being formed of short length compared with their diameter and being here shown as of less length than said diameter. Preferably, these rollers are of uniform size and roll in contact with each other.

The portion of our bearing between the walls or disks 8, 9 forms the intermediate part of the bearing and said intermediate part is formed at its ends with flanges constituting the end walls of the channels 6 and the peripheral and inner side walls of the raceways 3, and the end flanges of said intermediate part are detachably secured by the bolts 10, 11, to the outer portions of said walls or disks 8, 9.

As will be obvious to those skilled in the art, the flat sides or surfaces of the raceways and the flat ends or surfaces of the rollers 29 prevent any tendency of the rollers to twist in said raceways, and thus avoid liability of breakage and injury of the rollers and the surfaces upon which they roll. Moreover, by constructing and arranging the raceways and rollers as described, it is possible to use our bearing upon standard truck-frames without modification or change of such truck-frames, and the rollers are of relatively large diameter and afford a maximum degree of support in a compact structure and with a minimum liability of wear and injury of the rollers and the surfaces engaged by their peripheries.

Preferably, the surfaces of the rollers 29 nearest the axis of the bearing engage the ends of a sleeve 30 arranged in the axle opening and mounted upon the axle 25, and having a channel 31 in its outer end for receiving and fitting the opposing end of the disk 20, and the opposite surfaces of said rollers 29 engage hard rings 32 forming parts of the circumferential walls of the raceways and fitting the contiguous portions of the journal box. These rings are preferably split transversely, and opposite sides of the slits extending transversely therethrough are provided with inwardly diverging surfaces 33 which are engaged by the wedge-shaped ends 34 of bolts 35 extending radially through the portions of the journal box encircling the rings 32. To those skilled in the art it will be apparent that the rings 32 instead of being split transversely may be continuous, and that said rings may be dispensed with and the rollers 29 engaged directly with the contiguous wall of the journal box. It will also be apparent that as the peripheries of the rollers 29 and the faces engaged by said peripheries are parallel to the axle 25, the journal box or the axle when subjected to the strains experienced in use may have a slight axial movement without undue binding and wear of the parts.

What we claim is:—

1. A bearing for one end of a rotatable shaft, said bearing having an axle receiving opening therein which opens through one end wall thereof, and its opposite end closed and having a chamber within the closed end in alinement with said opening, and said bearing having narrow annular raceways adjacent the opposite ends of said axle opening, of greater diameter than the same and provided with opposing flat side walls, said bearing comprising an intermediate part having at its ends flanges constituting the peripheral and inner side walls of said raceways, a disk constituting the inner end of the bearing and provided with an axial opening and detachably secured at its outer portion to the edge of the adjacent end flange of the intermediate part, said disk having a flat side constituting a side wall of the raceway at the inner end of the bearing, and means for closing the outer end of the bearing comprising a second disk having said chamber arranged axially thereof, said second disk being detachably secured to the edge of the flange at the outer end of the intermediate part and having a flat face forming a side wall of the raceway at the outer end of the bearing, substantially as and for the purpose described.

2. A bearing having an axle receiving opening therein, and extending through one end wall thereof, the opposite end of the bearing being closed, and said bearing having a chamber between said closed end and the axle receiving opening and having at opposite ends of the latter roller raceways opening into the axle receiving opening, and of larger diameter than the same, said bearing having externally thereof channels on opposite sides of the same located between the planes of the raceways, and a spring seat located on its upper surface, and said bearing comprising an intermediate member provided with end flanges constituting the side walls of the channels and the side and peripheral walls of the roller raceways, a disk having a central opening, said disk being secured to the inner end of the intermediate member and having surfaces constituting a side wall of the raceway at the inner end of the bearing, a second disk having an axial opening and a member carried thereby and constituting therewith the outer end wall of the bearing and providing said chamber, the second disk being secured to the flange at the outer end of the intermediate member and having a surface constituting a side wall of the other raceway, substantially as and for the purpose specified.

3. A bearing for one end of a rotatable shaft, said bearing having an axle receiving opening therein which opens through one end wall of the same and having its opposite end wall closed and a chamber within the closed end in alinement with said opening, and said bearing having narrow annular roller raceways opening into said axle receiving opening adjacent the opposite ends thereof, said bearing comprising an intermediate member having end flanges constituting the peripheral and inner side walls of the raceways, a disk constituting the inner end of the bearing and forming a side wall of the raceway at the inner end of the bearing, a detachable member and a second disk carrying the same and constituting therewith the closed end of the bearing and providing said chamber, the said disk having surfaces constituting a side wall of the other raceway, a single series of rollers located in each raceway and having flat ends contacting with the side walls of the raceway containing the same, and antifriction thrust bearings located in said chamber, substantially as and for the purpose set forth.

In testimony whereof, we have hereunto signed our names in the presence of two attesting witnesses, at Syracuse, in the county of Onondaga, in the State of New York, this 26th day of October, 1909.

WILLARD C. LIPE.
HARRY D. WEED.

Witnesses:
S. DAVIS,
E. K. SEEMILLER.

Copies of this patent may be obtained for five cents each, by addressing the "Commissioner of Patents, Washington, D. C."